United States Patent Office 3,090,802
Patented May 21, 1963

1

3,090,802
ALKYLENE GLYCOL BORATES
Irving S. Bengelsdorf, Santa Ana, Calif., assignor to United States Borax & Chemical Corporation, Los Angeles, Calif., a corporation of Nevada
No Drawing. Filed July 27, 1962, Ser. No. 213,058
5 Claims. (Cl. 260—462)

This invention relates to novel alkylene glycol borates and more particularly to long chain unsaturated compounds having two alkylene glycol borate rings.

It is, therefore, an object of this invention to provide as new compositions certain long chain unsaturated compounds having two alkylene glycol borate rings.

It is a further object of this invention to provide methods for preparing such compositions. Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

There are provided by this invention the compounds having the formula

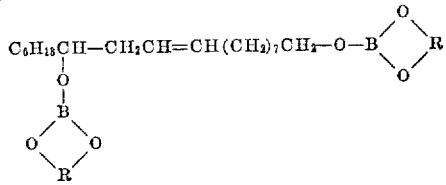

where R is an alkylene radical of 2 to 3 carbon atoms in length and containing a total of 2 to about 20 carbon atoms.

When R is an alkylene radical of 2 carbon atoms in length, the compound can be named as a 1,12-di[2'-(1',3'-dioxa-2-borolanyloxy)]octadecene-9. When R is an alkylene radical of 3 carbon atoms in length, the compound can be named as a 1,12-di[2'-(1',3'-dioxa-2-borinanyloxy)]octadecene-9. The carbon atoms of the boron-containing rings can be unsubstituted or they can be substituted with lower alkyl groups. The presently preferred compounds are those having one or more lower alkyl groups, for example, methyl, as substituents on the carbon atoms of the ring.

The borates of this invention are useful as plasticizers, lubricants, and as herbicides, which exhibit phytotoxic properties when applied to the foliage of growing plants.

The compounds of this invention are readily prepared by reaction of 9-octadecene-1,12-diol (ricinoleyl alcohol) with the appropriate alkylene glycol monoborate or a lower alkyl ester of the appropriate glycol monoborate, as illustrated by the equation:

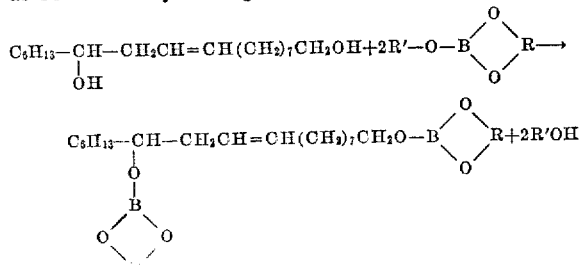

2 where R is an alkylene radical of 2 to 3 carbon atoms in length and containing a total of 2 to about 20 carbon atoms and R' is hydrogen or a lower alkyl group having, for example, 1 to about 8 carbon atoms.

The glycol monoborate reactants are well known to the art and are readily available. Examples of suitable reactants include 2-hydroxy-4,4,6-trimethyl-1,3-dioxa-2-borinane
2-hydroxy-4-methyl-1,3-dioxa-2-borolane
2-butoxy-1,3-dioxa-2-borinane
2-ethoxy-4,4,6-trimethyl-1,3-dioxa-2-borinane
2-pentoxy-4,5,5-trimethyl-1,3-dioxa-2-borinane
2-butoxy-5-methyl-5-ethyl-1,3-dioxa-2-borinane
2-hydroxy-1,3-dioxa-2-borolane
2-butoxy-4-isopropyl-5,5-dimethyl-1,3-dioxa-2-borinane At least two moles of glycol monoborate is used for each mole of diol present in order to obtain best yields of the desired product. The reaction takes place at elevated temperatures in a relatively short time. For example, at a preferred reaction temperature of about 50° C. to about 125° C., a good yield of the desired product is obtained in about 2 to 5 hours. The progress of the reaction is easily followed by the formation of the by-product, water or lower alkanol. Preferably, a hydrocarbon solvent is used as a reaction medium so as to maintain close control of the reaction temperature and facilitate removal of the by-products as they are formed, as for example, by azeotropic distillation. The desired product is isolated and purified by conventional procedures well known to those skilled in the art.

Examples of representative compounds of this invention include 1,12 - di - [2' - (4',4',6' - trimethyl - 1',3' - dioxa-2'-borinanyloxy)]octadecene-9
1,12 - di - [2' - (4',4',5',5' - tetramethyl - 1',3' - dioxa-2'-borolanyloxy)]octadecene-9
1,12 - di - [2' - (4' - methyl - 1',3' - dioxa - 2' - borinanyloxy)]octadecene-9
1,12 - di - [2' - (4' - ethyl - 5' - methyl - 1',3' - dioxa-2'-borolanyloxy)]octadecene-9
1,12-di-[2'-(1',3'-dioxa-2'-borinanyloxy)]octadecene-9
1,12-di-[2'-(1',3'-dioxa-2'-boronyloxy)]octadecene-9
1,12, - di - [2' - (4' - methyl - 6' - propyl - 1',3' - dioxa-2'-borinanyloxy)]octadecene-9

The following example illustrates the preparation of a representative compound of this invention, but is not intended to limit the invention to the particular example.

I. *1,12-Di-[2'-(4',4',6'-Trimethyl-1',3'-Dioxa-2'-Borinanyloxy)]Octadecene-9*

A solution of 142.3 grams (0.5 mole) of ricinoleyl alcohol (9-octadecene-1,12-diol) and 144 grams (1.0 mole) of 2-hydroxy-4,4,6-trimethyl-1,3-dioxa-2-borinane in 350 ml. of cyclohexane was stirred in a flask at reflux temperature. The byproduct water was removed by means of a Dean-Stark trap as it was formed. Refluxing was continued until the theoretrical amount of water had been taken off (about 3.5 hours). The cyclohexane was removed by distillation under reduced pressure. In an attempt to distill the residue under reduced pressure, the pot temperature was taken up to 240° C. at 0.75 mm., removing all volatiles, but the product did not distill.

The product (265 g.) was a pale yellow, mobile liquid, having a boron content of 3.9% (calculated for $$C_{30}H_{68}O_6B_2$$

B, 4.04%). The infrared spectrum was consistent with the structure of the expected product.

Other modes of applying the principle of the invention may be employed, change being made as regards the details described, provided the features stated in any of the following claims or the equivalent of such be employed.

I, therefore, particularly point out and distinctly claim as my invention:

1. The compound having the formula

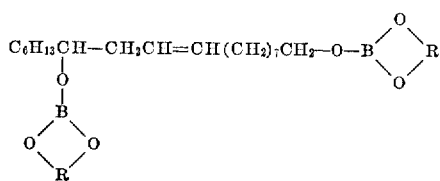

where R is an alkylene radical of 2 to 3 carbon atoms in length and containing a total of 2 to about 20 carbon atoms.

2. The compounds according to claim 1 in which said alkylene radical has lower alkyl substituents on the carbon atoms of the ring.

3. 1,12-di-[2'-(4',4',6' - trimethyl - 1',3'-dioxa-2'-borinanyloxy)]octadecene-9.

4. The method of producing an alkylene glycol borate having the formula

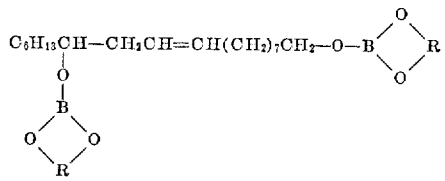

which comprises reacting 9-octadecene-1,12-diol with a borate of the formula

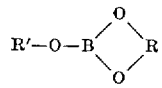

where R is an alkylene radical of 2 to 3 carbon atoms in length and containing a total of 2 to about 20 carbon atoms and R' is selected from the group consisting of hydrogen and the lower alkyl groups, at least two moles of said borate being present for each mole of diol.

5. The method of producing 1,12-di-[2'-(4',4',6'-trimethyl - 1',3' - dioxa - 2'-borinanyloxy)]octadecene - 9, which comprises reacting 9-octadecene-1,12-diol with 2-hydroxy-4,4,6-trimethyl-1,3-dioxa-2-borinane at an elevated temperature and removing water from the system as it is formed, wherein about two moles of said 2-hydroxy-4,4,6-trimethyl - 1,3-dioxa - 2-borinane is present for each mole of diol.

No references cited.

UNITED STATES PATENT OFFICE
CERTIFICATE OF CORRECTION

Patent No. 3,090,802            May 21, 1963

Irving S. Bengelsdorf

It is hereby certified that error appears in the above numbered patent requiring correction and that the said Letters Patent should read as corrected below.

Column 3, line 4, for "$C_{30}H_{68}O_6B_2$" read -- $C_{30}H_{58}O_6B_2$ --; line 14, for "compound" read -- compounds --.

Signed and sealed this 26th day of November 1963.

(SEAL)
Attest:
ERNEST W. SWIDER

Attesting Officer

EDWIN L. REYNOLDS

Acting Commissioner of Patents